(12) United States Patent
Polyudov (10) Patent No.: US 8,661,425 B1
(45) Date of Patent: Feb. 25, 2014

(54) METHOD, APPARATUS, AND COMPUTER-READABLE MEDIUM FOR STORING DATA ASSOCIATED WITH A FIRMWARE PROGRAM

(75) Inventor: Feliks Polyudov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 1667 days.

(21) Appl. No.: 11/495,022

(22) Filed: Jul. 28, 2006

(51) Int. Cl.
*G06F 9/44* (2006.01)

(52) U.S. Cl.
USPC .......................................... 717/162; 717/165

(58) Field of Classification Search
USPC ................................................ 717/136, 162
See application file for complete search history.

(56) References Cited

U.S. PATENT DOCUMENTS

| | | | | |
|---|---|---|---|---|
| 5,586,329 A | * | 12/1996 | Knudsen et al. | 717/108 |
| 6,449,682 B1 | * | 9/2002 | Toorians | 711/100 |
| 7,676,800 B2 | * | 3/2010 | Kinney | 717/162 |
| 7,694,291 B2 | * | 4/2010 | Chen et al. | 717/162 |
| 2002/0169979 A1 | * | 11/2002 | Zimmer | 713/200 |
| 2004/0139070 A1 | * | 7/2004 | Dysart et al. | 707/3 |
| 2004/0243992 A1 | * | 12/2004 | Gustafson et al. | 717/168 |
| 2005/0108433 A1 | * | 5/2005 | Wu et al. | 709/246 |
| 2005/0188368 A1 | * | 8/2005 | Kinney | 717/174 |
| 2006/0020912 A1 | * | 1/2006 | Illowsky et al. | 717/103 |
| 2006/0101432 A1 | * | 5/2006 | Simons et al. | 717/138 |

OTHER PUBLICATIONS

Pietrek, Matt; "Peering Inside the PE: A Tour of the Win32 Portable Executable File Format," Mar. 1994, MSDN, 30pg.*

* cited by examiner

*Primary Examiner* — Li B Zhen
*Assistant Examiner* — Ryan Coyer
(74) *Attorney, Agent, or Firm* — Hope Baldauff, LLC (57) ABSTRACT

A method for storing a data file associated with a source code file of a firmware program in an EFI environment is provided. The method involves converting the data file to an object file as well as converting the firmware source code file to an object file. An executable file is then created from the object file of the data file and the object file of the firmware source code file. Once created, the executable file may be stored in a file of a firmware storage device.

11 Claims, 5 Drawing Sheets

METHOD, APPARATUS, AND COMPUTER-READABLE MEDIUM FOR STORING DATA ASSOCIATED WITH A FIRMWARE PROGRAM

TECHNICAL FIELD

The present invention is related to data storage. More particularly, the present invention is related to creating an executable file including a firmware program and data associated with the firmware program and storing the executable file in a firmware storage device.

BACKGROUND

In many computing systems, low level instruction code is used as an intermediary between the hardware components of the computing system and the operating software and other high level software executing on the computing system. In some computer systems, this low level instruction code is known as the Basic Input/Output System ("BIOS"). The BIOS provides a set of software routines that allow high level software to interact with the hardware components of the computing system using standard calls. BIOS-compatible firmware implementations may be referred to herein as "legacy BIOS."

Because of limitations of the BIOS utilized in many PC-compatible computers, a new firmware architecture for booting the computer and for intermediating the communication between the operating system and the hardware has been proposed. The new architecture is defined via a set of specifications. One of the specifications is called the Extensible Firmware Interface ("EFI") specification and is available from INTEL CORPORATION. The original EFI Specification from INTEL CORPORATION is also being extended by the Unified Extensible Firmware Interface Forum ("UEFI").

The EFI specification describes an EFI environment that provides an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

Additional details regarding the EFI and UEFI firmware architecture are defined by the group of specifications called INTEL Platform Innovation Framework for EFI ("the Framework") and available from INTEL CORPORATION. Unlike the EFI Specification, which focuses on programmatic interfaces for the interactions between the operating system and system firmware, the Framework defines programmatic interfaces to perform the full range of operations that are required to initialize the platform from power on through transfer of control to the operating system.

In general, the storage repository for firmware code and/or data of the Framework is a firmware volume. A firmware volume may be formed from a single firmware device, multiple firmware devices, or a firmware device divided into smaller pieces to form multiple logical firmware devices. Each firmware volume is organized into a Firmware File System ("FFS") including multiple FFS files. Typically, the FFS files of a firmware volume include a header and at least one section for storing the firmware code and/or data. The firmware code and/or data may be included in executable files or firmware modules. Therefore, sections of an FFS file may include executable files or firmware modules.

Often, the firmware source code represented in the executable files of the FFS file sections is associated with data that is separate from but needs to remain connected with the firmware source code so that the data can be used by the firmware source code once converted to an executable format. For example, such data may include scripts that define a page of the firmware setup utility, central processing unit ("CPU") microcode which includes code supplied directly to the CPU, a firmware logo, or audio files. This data may be converted to a computer programming language, such as C programming language, and then compiled with the firmware source code to form an executable file. However, when the data is converted to a computer programming language and compiled with the firmware source code, the data often becomes indistinguishable from the firmware source code. Therefore, there is a need to convert and compile data associated with a firmware source code such that the data remains connected with but distinguishable from the firmware source code.

SUMMARY OF THE INVENTION

In accordance with the present invention, the above and other problems are solved by providing in a computer network a method, system, and computer-readable medium for storing data associated with a firmware program in an EFI environment. According to one aspect of the present invention, a method is provided for storing a data file associated with a firmware source code file. The method involves converting the data file to an object file as well as converting the firmware source code file to an object file. An executable file is then created from the object file of the data file and the object file of the firmware source code file. Once created, the executable file may be stored in a file of a firmware storage device.

According to another aspect of the present invention, a computer-readable medium is provided having instructions stored thereon which, when executed by a computer, causes the computer to convert a data file associated with a firmware source code file to an object file. The firmware source code file is also converted to an object file. An executable file is then created from the object files of the data file and the firmware source code file and stored in a file of a firmware storage device.

According to yet another aspect of the present invention, a method is provided for storing a data file associated with a firmware source code file. The method involves converting the data file and the firmware source code file to an object file. The data may include graphics, text, or an audio file associated with the firmware source code file. The object file of the data file and the object file of the firmware source code file may then be assembled into an executable file.

DETAILED DESCRIPTION OF THE INVENTION

Embodiments of the present invention provide methods, systems, apparatus, and computer-readable media for storing data associated with a firmware program in an EFI environment. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
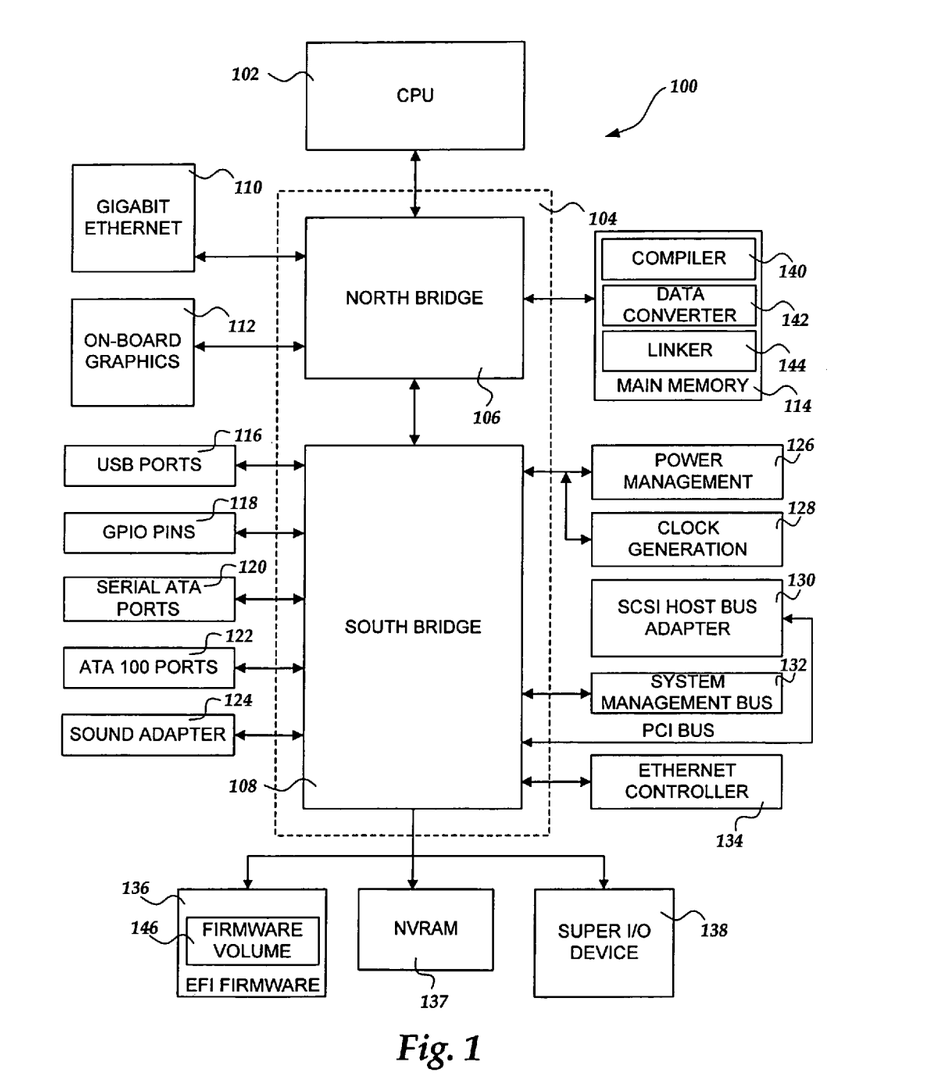
FIG. 1 is a computer architecture diagram showing aspects of a computer utilized in various embodiments of the present invention.

FIG. 1 and the following discussion are intended to provide a brief, general description of a suitable computing environment in which the invention may be implemented. While the invention will be described in the general context of program modules that execute in conjunction with an EFI firmware, those skilled in the art will recognize that the invention may also be implemented in combination with other types of program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that is operative to create an executable file including data associated with a firmware program and to store the executable file in a firmware storage device.

In order to provide the functionality described herein, the computer 100 includes a baseboard, or "motherboard", which is a printed circuit board to which a multitude of components or devices may be connected by way of a system bus or other electrical communication path. In one illustrative embodiment, a CPU 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to the random access memory ("RAM") used as the main memory 114 and, possibly, an on-board graphics adapter 112. In an embodiment of the present invention, the main memory 114 may include a compiler 140, a data converter 142, and a linker 144 for creating an executable file from source code of a firmware program and data associated with the firmware source code. The compiler 140 includes a program operative to convert source code of a firmware program to a machine code stored in the format of an object file. As will be discussed further with regard to FIGS. 2 and 4, the data converter 142 includes a program capable of converting a file containing the data associated with the firmware program to an object file. Once the firmware source code and related data are converted to a format of an object file, the linker 144 is operative to assemble the object files into an executable file, which is capable of being interpreted and executed by the computer 100.

The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a SCSI host bus adapter 130. The bus may comprise a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, the south bridge 108 may include a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

One or more mass storage devices may also be connected to the SCSI host bus adapter 130. The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing EFI firmware 136 that includes program code containing the basic routines that help to start up the computer 100 and to transfer information between elements within the computer 100. The LPC interface may also be utilized to connect a non-volatile random access memory ("NVRAM") 137 to the computer 100. The NVRAM 137 may be utilized by the EFI firmware 136 to store configuration data for the computer 100.

The EFI firmware 136 comprises a firmware which is compatible with the EFI specification from INTEL CORPORATION and includes a plurality of executable files and firmware modules. As will be discussed further in view of FIGS. 3-4, the storage repository for the executable files and firmware modules of the EFI and the Framework compliant firmware 136 may be a firmware volume 146. The EFI specification describes an interface between the operating system of the computer 100 and the EFI firmware 136. The EFI specification defines the interface that platform firmware must implement, and the interface that the operating system may use in booting. How the EFI firmware 136 implements the interface is left up to the manufacturer of the firmware. The intent of the specification is to define a way for the operating system and the firmware 136 to communicate only information necessary to support the operating system boot process. This is accomplished through a formal and complete abstract specification of the software-visible interface presented to the operating system by the platform and the firmware.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
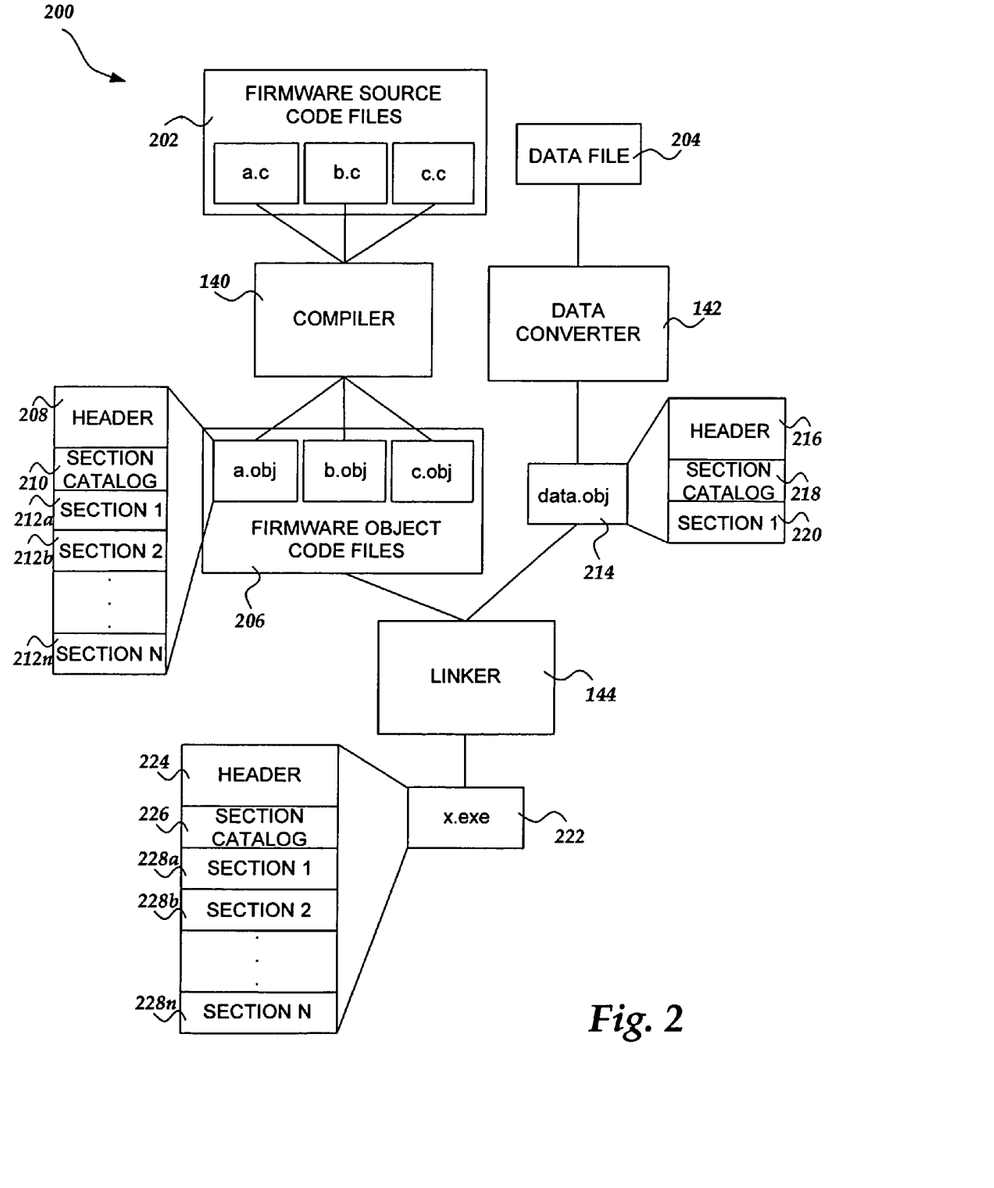
FIG. 2 illustrates a translation hierarchy utilized in various embodiments of the present invention.

Turning now to FIG. 2, a translation hierarchy 200 used to convert firmware source code of the EFI firmware 136 and data associated with the firmware source code to an executable format will be described. As briefly discussed above, the EFI firmware 136 includes a number of executable files containing information representative of firmware source code files 202 associated with the EFI firmware as well as a data file 204 associated with the firmware source code files. Although separate from the firmware source code files 202, the data file 204 associated with the firmware source code files 202 needs to remain connected with but distinguishable from the firmware source code files so that the data file can be used by the firmware source code files. In an embodiment of the present invention, the data file 204 may include data such as, for example, scripts that define a page of the setup utility included into EFI firmware 136, CPU microcode which includes code supplied directly to the CPU 102, an audio file, or a graphic such as, for example, a firmware logo.

To retain a connection between the firmware source code files 202 and the data file 204 while keeping the source code files and the data file distinguishable, the compiler 140 converts the firmware source code files to object files 206, and the data converter 142 converts the data file to a data object file 214. When converting the firmware source code files 202 to the object files 206, the compiler 140 may translate the firmware source code stored in the firmware source code files to firmware machine code and create the firmware object files for storing the firmware machine code. In addition to the firmware machine code, the firmware object files 206 may also include relocation information related to the firmware machine code that is used by the linker 144 to assemble the multiple object files into an executable file 222.

The structure of the firmware object files 206 depends on the object file format of the files. In an embodiment of the present invention, the object file format of the firmware is a Common Object File Format ("COFF"). It should be understood by those skilled in the art that the object file format may also include an Executable and Linking Format ("ELF"), an INTEL Object Modules Format ("OMF"), or an IEEE-695 object file format. As illustrated in FIG. 2, the beginning of each of the firmware object files 206 includes a header 208 that provides overall information about each of the firmware object files. In particular, the header 208 of each of the firmware object files 206 includes information regarding the target machine on which the firmware object files are executable, the number of sections in each firmware object file, and a time date stamp indicating when each of the firmware object files was created.

Each of the firmware object files 206 also includes a section catalog 210 immediately following the header 208. The section catalog 210 specifies information regarding sections 212a-212n of each of the firmware object files 206 and includes an entry for each of the sections. In an embodiment of the present invention, the section catalog 210 of each of the firmware object files 206 includes a name associated with each of the sections 212a-212n of the firmware object files, an address at which the information stored in each of the sections should be loaded into memory, an address of the information stored in each of the sections, and a size associated with the information stored in each of the sections. Each of the sections 212a-212n of the firmware object files 206 includes a collection of information of a similar type. For instance, COFF object files, similar to the firmware object files 206, typically include a section known as a .text section where the firmware machine code translated by the compiler 140 is stored as well as a section known as a .data section which includes all data variables initialized by a user. The firmware object files 206 may also include relocation information for each of the sections 212a-212n of the files which is used by the linker 144 to generate the executable file 222 at link time.

Similar to the description given above regarding converting firmware source code files 202 to firmware object files 206, the data converter 142 converts the data file 204 to the data object file 214 by creating the data object file for storing the data of the data file. The data object file 214 created by the data converter 142 includes a header 216, a section catalog 218, and a section 220, similar to the header 208, the section catalog 210 and the sections 212a-212n of the firmware object files 206 discussed above. By creating the data object file 214 having a similar structure and sections as the firmware object files 206, the data object file is compatible and linkable with the firmware object files when the files are provided to the linker 144.

Once the firmware source code files 202 and the data file 204 are converted to object files 206 and 214, respectively, the linker 144 assembles the files of the firmware object files 206 along with the data object file 214 to create the single executable file 222. In an embodiment of the present invention, the linker 144 may recognize the data object file 214 as including unknown sections. However, since the linker 144 does not include any special programming related to unknown sections, the linker may assemble the data of the data object file 214 with the firmware object code of the firmware object files 206 to create the executable code of the executable file 222.

Like the firmware object files 206 and the data object file 214, the structure of the firmware executable file 222 depends on the file format of the executable file. In an embodiment of the present invention, the firmware executable file 222 created by the linker 144 may include a structure similar to the COFF of the object files described above. In particular, the file format of the firmware executable file 222 may be a Portable Executable ("PE") format. As illustrated in FIG. 2, the beginning of the firmware executable file 222 includes a header 224 that provides overall information about the executable file. In particular, the header 224 of the firmware executable file 222 includes a PE signature which identifies the executable file as a PE format file, information similar to the information included in the COFF headers of the firmware object files 206 and the data object file 214, and an optional header including information for a loader (not shown) which copies the firmware executable code of the executable file 222 into the main memory 114 of the computer 100 when the firmware executable code (firmware program) is executed.

The firmware executable file 222 also includes a section catalog 226 immediately following the header 224. The section catalog 226 specifies information regarding sections 228a-228n of the firmware executable file 222 and includes an entry for each of the sections. In an embodiment of the present invention, each entry of the section catalog 226 includes a name associated with each of the sections 228a-228n of the firmware executable file 222, an address at which the information stored in each of the sections should be loaded into memory, an address of the information stored in each of the sections, and a size associated with the information stored in each of the sections. Each of the sections 228a-228n of the firmware executable file 222 includes a collection of information of a similar type. For instance, a PE format file, similar to the firmware executable file 222, typically includes a section known as a .text section where the firmware executable code is stored as well as a section known as a .data section which includes all data variables initialized by a user.

Once the firmware executable file 222 is created, the computer 100 is operative to execute the firmware program of the executable file. To locate the data of the data file 204 stored within the executable file 222, the executable file may be traversed, starting at the header 224, until the section catalog 226 is located. Once found, the section catalog 226 may be searched until the entry associated with the section containing the data of the data file 204 is located. The entry associated with the section containing the data of the data file 204 may be determined by searching for the entry including a section name associated with the data of the data file 204. The section of the executable file 222 corresponding to the determined entry of the section catalog 226 and including the data of the data file 204 may then be located within the executable file based on the address information provided by the section catalog.

Figure 3:
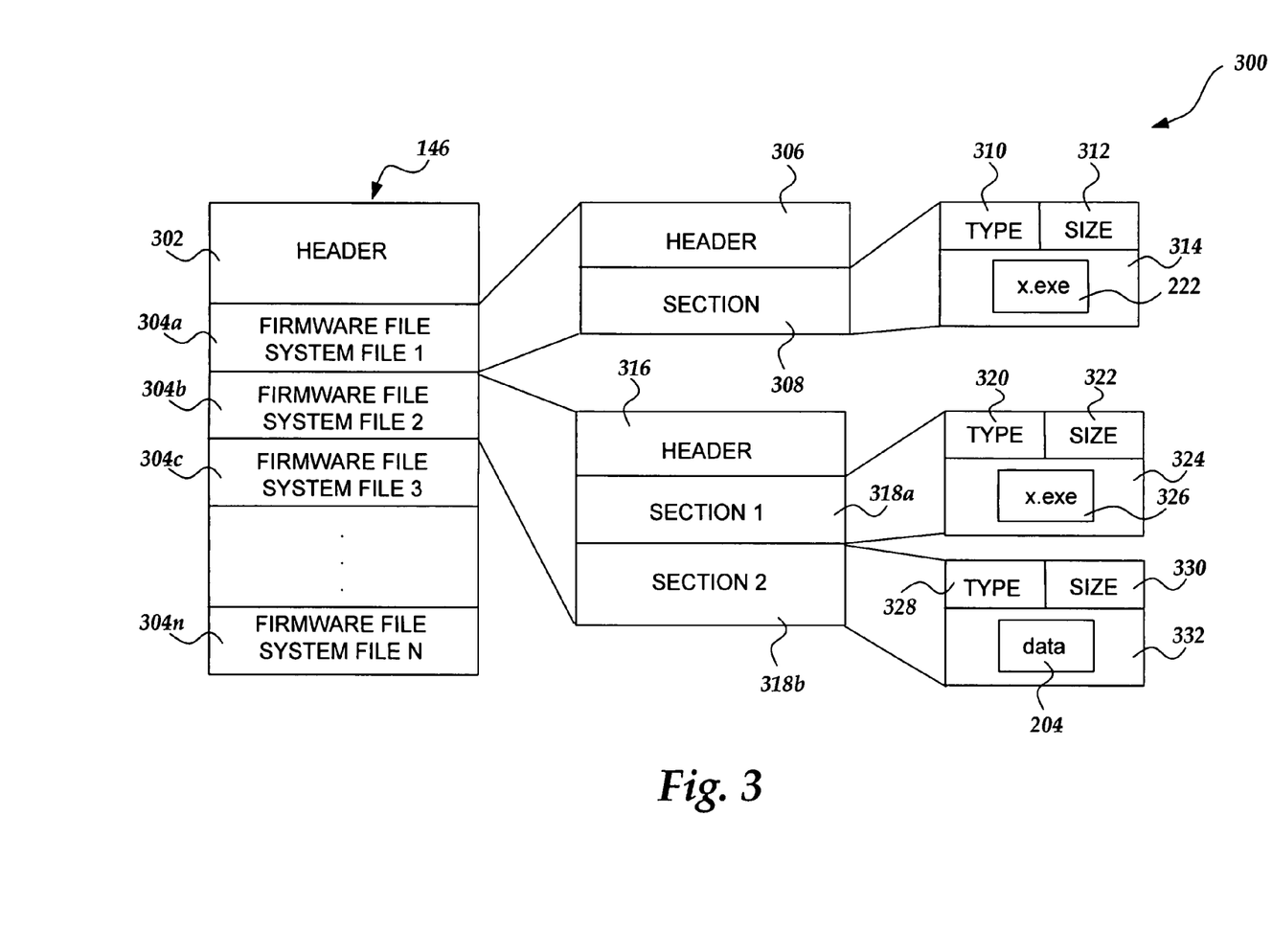
FIG. 3 illustrates a structure of a firmware storage device according to an embodiment of the present invention.

Turning now to FIG. 3, a layout 300 of the firmware volume 146 of the EFI firmware 136 will now be described. As briefly discussed above, the firmware volume 146 is the storage repository for the EFI firmware 136. The firmware volume 146 may be formed from a single firmware device, multiple firmware devices, or a firmware device divided into smaller pieces to form multiple logical firmware devices. In an embodiment of the present invention, the firmware volume 146 is organized into a FFS including FFS files 304a-304n. Each of the FFS files 304a-304n of the firmware volume 146 includes a header, such as the header 306 of the FFS file 304a and the header 316 of the FFS file 304b, and one or more sections, such as the section 308 of the FFS file 304a and sections 318a-318b of the FFS file 304b. The header may include information regarding the state and contents of the FFS file. In an embodiment of the present invention, the header includes a name associated with the FFS file, information regarding the integrity of the FFS file, a file type of the FFS file, information regarding various file attribute bits, and the length of the FFS file in bytes.

The one or more sections of each of the FFS files 304a-304n store firmware code and data associated with the EFI firmware 136. A section, such as the section 308 of the FFS file 304a, may contain a type field 310 indicating the type of information stored in the section as well as a size field 312 which provides information regarding the size of the firmware code or data stored in the section. The section 308a may further include a file portion 314 for storing firmware code or data associated with the EFI firmware 136. As discussed with regard to FIG. 2, in an embodiment of the present invention, the firmware code and data associated with the EFI firmware 136 may both be included within the executable file 222. The executable file 222 may then be stored within the firmware volume 146. For example, as illustrated in FIG. 3, once the firmware executable file 222 including executable code representative of the firmware source code of the firmware source code files 202 and the data of the data file 204 is created as described above, the firmware executable file may be stored in a single section 308 of the FFS file 304a of the firmware volume.

In another embodiment of the present invention, data associated with the firmware code of the EFI firmware 136 may be stored outside of an executable file containing the firmware code. To store the firmware code and a data file including the data associated with the firmware code in the firmware volume 146 of the EFI firmware 136, the executable file containing the firmware code may be stored in a first section and the data file containing the data may be stored in a second section of one of the FFS files 304a-304n. For example, as illustrated in FIG. 3, the executable file 326 containing the firmware code may be stored in the first section 318a of the FFS file 304b, and the data file 204 containing the data associated with the firmware code may be stored in the second section 318b of the FFS file 304b.

In order to access the data associated with the firmware code stored in the FFS files 304a-304n of the firmware volume 146, a determination is made whether to use code capable of opening an executable file or code capable of opening a FFS file. In an embodiment of the present invention, the determination to use code to open an executable file or code to open a FFS file is made based on a flag set during the creation of the executable file. In particular, while the firmware code of the EFI firmware 136 is being converted from source code to an executable format, a flag may be set indicating whether data associated with the firmware code of the EFI firmware 136 is stored with the firmware code inside the executable file or separate from the firmware code outside of the executable file. When access to the data associated with the firmware code stored within the firmware volume 146 is requested, a determination may be made whether the flag associated with the firmware code indicates that the data associated with the firmware code is stored within the executable file. If the flag does indicate that the data associated with the firmware code is stored within the executable file, then the code capable of opening an executable file is used to access the data associated with the firmware code. On the other hand, if the flag indicates that the data associated with the firmware code is stored outside of the executable file, then the code capable of opening a FFS file is used to access the data associated with the firmware code.

In a further embodiment of the present invention, the determination to use code to open an executable file versus code to open a FFS file may be based on which code succeeds in accessing the data associated with the firmware code. In particular, when access to the data associated with the firmware code stored within the firmware volume 146 is requested, the code capable of opening an executable file may be initiated to try and access the data associated with the firmware code. If the code accesses the data associated with the firmware code, then the firmware code is stored in an executable file. However, if the code capable of opening an executable file does not access the data associated with the firmware code, then the code capable of opening a FFS file may be initiated to access the data associated with the firmware code.

In another embodiment of the present invention, a flag associated with each of the FFS files 304a-304n of the firmware volume 146 may be set indicating either that the data associated with the firmware code is stored in executable files or in FFS files. When access to the data associated with the firmware code is requested, a determination may be made whether the flag associated with one of the FFS files 304a-304n indicates that the data associated with the firmware code is stored within an executable file. If the flag does indicate that the data associated with the firmware code is stored within an executable file, then the code capable of opening an executable file is used to access the firmware code. On the other hand, if the flag indicates that the data associated with the firmware code is stored outside of an executable file, then the code capable of opening a firmware file is used to access the firmware code.

Figure 4:
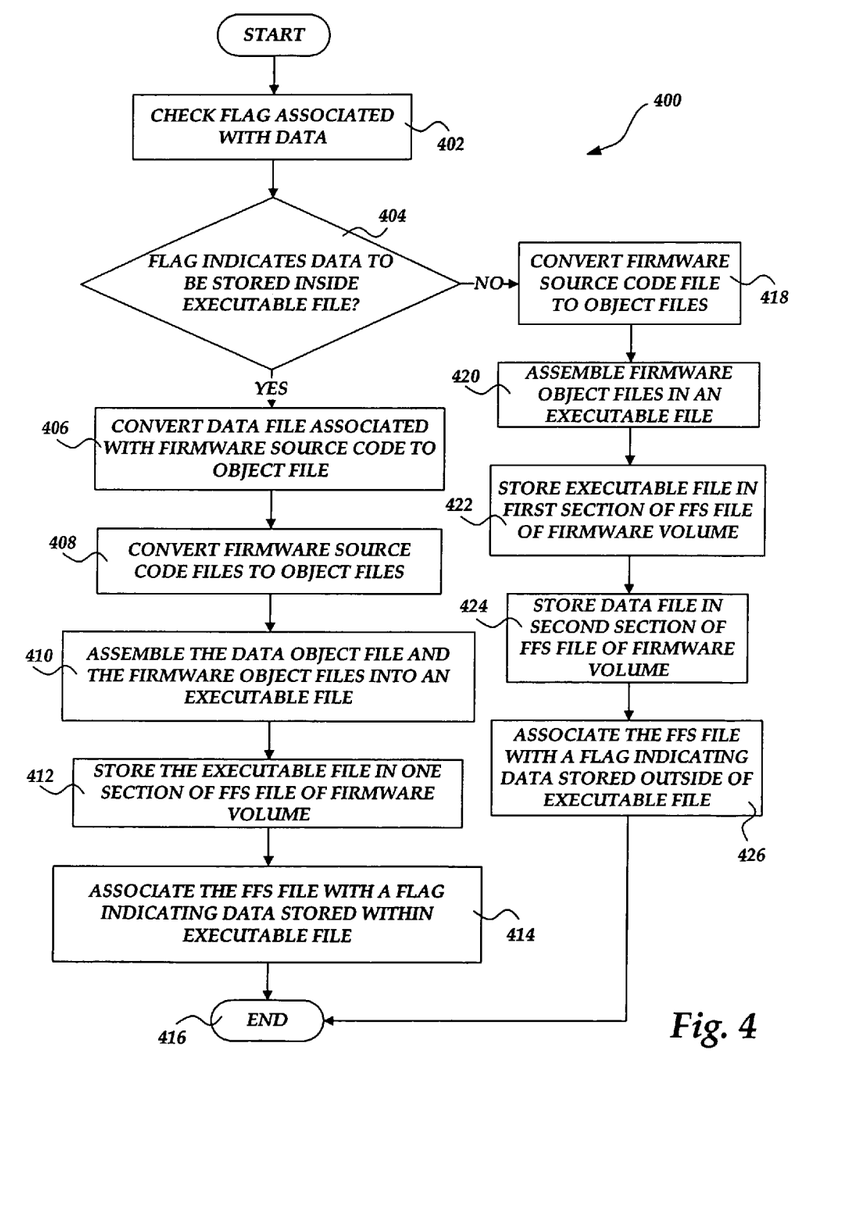
FIG. 4 is a flow diagram illustrating aspects of a process for storing data associated with a firmware program in an EFI environment according to an embodiment of the present invention.

Referring now to FIG. 4, additional details regarding the operation of the compiler 140, the data converter 142, and the linker 144 will be described. In particular, FIG. 4 illustrates a routine 400 performed by the compiler 140, the data converter 142, and the linker 144 for storing data associated with a firmware program of the EFI firmware 136 in a firmware volume 146 of the EFI firmware. The routine 400 begins at operation 402, where a flag associated with the firmware source code files 202 and the data file 204 is checked to determine whether data of the data file is to be stored with the firmware code of the firmware source code files inside an executable file or separate from the firmware code outside of an executable file. From operation 402, the routine 400 proceeds to operation 404, where a determination is made whether the flag indicates that the data of the data file 204 is to be stored inside an executable file. If the flag indicates that the data associated with the firmware code is to be stored inside an executable file, then the routine proceeds to operation 406.

At operation 406, the data file 204 associated with the firmware source code files 202 is converted by the data converter 142 to the data object file 214. In an embodiment of the invention, the data file 204 may be converted to the data object file 214 by creating the data object file including a header 216, a section catalog 218, and a section 220 for storing the data of the data file.

From operation 406, the routine 400 proceeds to operation 408, where the firmware source code files 202 are converted by the compiler 140 to firmware object files 206. As discussed, the firmware source code files 202 are converted to the firmware object files by translating the firmware source code of the firmware source code files to object code and creating the firmware source code files including a header 208, a section catalog 210, and sections 212a-212n for storing the firmware object code. The routine 400 then proceeds to operation 410, where the firmware object files 206 and the data object file 214 are assembled by the linker 144 to create the firmware executable file 222. As discussed above, the firmware executable file 222 has a structure similar to the firmware and data object files 206, 214. In particular, the firmware executable file includes a header 224, a section catalog 226, and sections 228a-228n for storing the firmware executable code.

From operation 410, the routine 400 proceeds to operation 412, where the firmware executable file 222 is stored in one section, such as the section 308, of a FFS file, such as the FFS file 304a, of the firmware volume 146 associated with the EFI firmware 136. The routine 400 then proceeds to operation 414. At operation 414, the FFS file 304a that received the firmware executable file 222 is associated with a flag indicating that the data associated with the firmware code is stored inside an executable file. From operation 414, the routine 400 proceeds to operation 416 where it ends.

If, back at operation 404, a determination is made that the flag associated with the firmware source code files 202 and the data file 204 does not indicate that the data of the data file is stored inside an executable file, then the routine 400 proceeds to operation 418, where the firmware source code files are converted to firmware object files 206 by translating the firmware source code of the firmware source code files to object code and creating the firmware source code files including a header, a section catalog, and sections for storing the firmware object code.

From operation 418, the routine 400 proceeds to operation 420, where the firmware object files 206 are assembled to create the firmware executable file 326. The firmware executable file 326 is then stored in the first section 318a of the FFS file 304b of the firmware volume 146 at operation 422. The routine 400 then proceeds to operation 424, where the data file 204 including the data associated with the firmware code of the firmware executable file 326 is stored in the second section 318b of the FFS file 304b. At operation 426, the FFS file 304b that received the firmware executable file 326 and the data file 204 is associated with a flag indicating that the data associated with the firmware code is stored outside of an executable file. From operation 426, the routine 400 proceeds to operation 416 where it ends.

Figure 5:
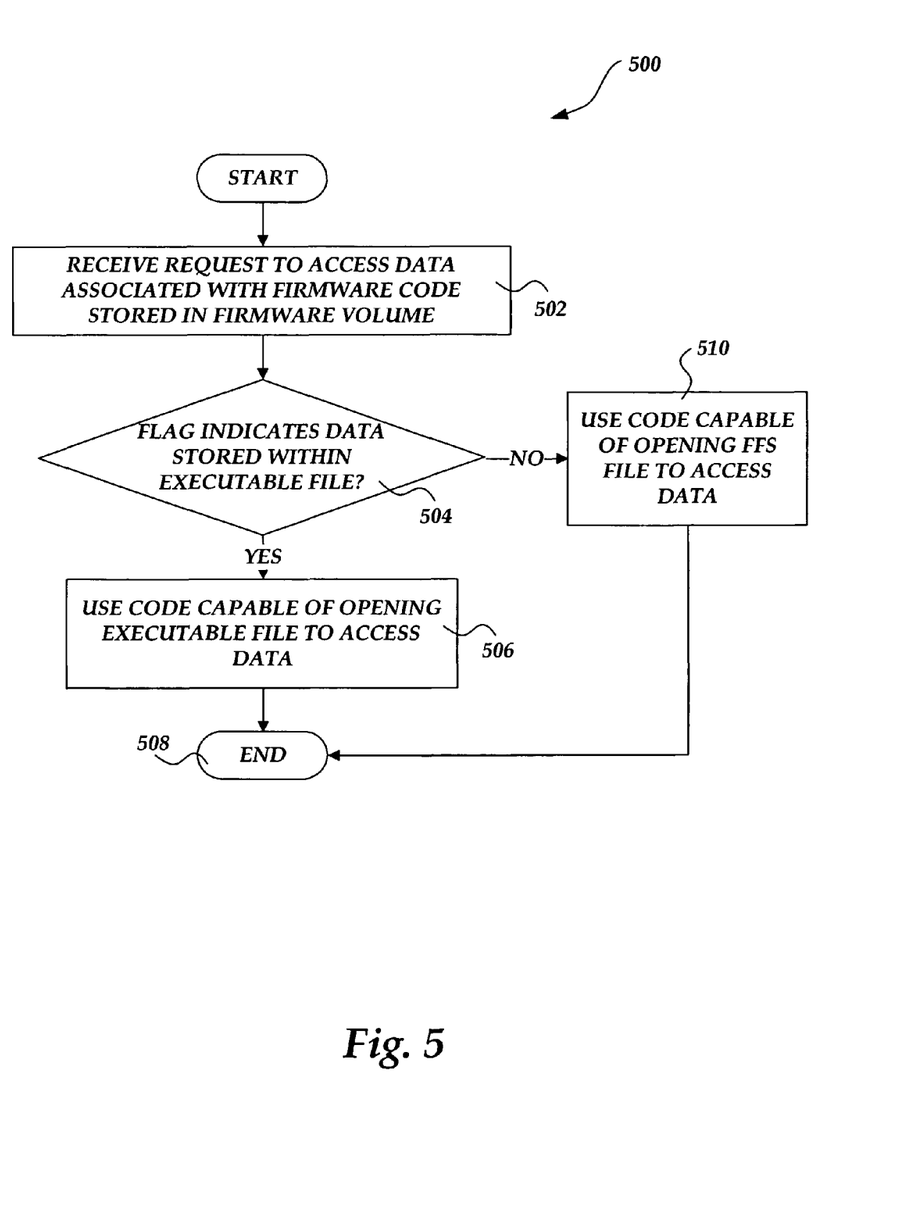
FIG. 5 is a flow diagram illustrating aspects of a process for accessing data associated with a firmware program from a firmware storage device according to an embodiment of the present invention.

Turning now to FIG. 5, additional details regarding a routine 500 for accessing data stored within the firmware volume 146 will be described. The routine 500 begins at operation 502, where a request is received to access data associated with the firmware code and stored within the firmware volume 146 is received. Once the FFS file storing the requested firmware code is located, the routine 500 then proceeds to operation 504, where a determination is made whether the FFS file storing the requested firmware code is associated with a flag indicating that the requested data associated with firmware code is stored inside an executable file within the FFS file. If the flag associated with the FFS file storing the requested data indicates that the requested data is stored inside an executable file, such as the firmware executable file 222, then the routine 500 proceeds to operation 506, where code capable of opening an executable file is used to access the requested data. From operation 506, the routine 500 proceeds to operation 508, where it ends.

On the other hand, if, at operation 504, a determination is made that the flag associated with the FFS file storing the requested data does not indicate that the requested data is stored in an executable file, then the routine 500 proceeds to operation 510 where code capable of opening a FFS file is used to access the requested data. From operation 510, the routine 500 proceeds to operation 508, where it ends.

It will be appreciated that embodiments of the present invention provide methods, systems, apparatus, and computer-readable medium for storing data associated with a firmware program in an EFI environment. Although the invention has been described in language specific to computer structural features, methodological acts, and by computer readable media, it is to be understood that the invention defined in the appended claims is not necessarily limited to the specific structures, acts, or media described. Therefore, the specific structural features, acts, and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for storing a data file associated with a firmware source code file, the method comprising:
    obtaining firmware source code files comprising firmware source code;
    obtaining a data file comprising data associated with the firmware source code files, wherein the data is separate from the firmware source code, and wherein the data file comprises one or more of: scripts comprising definitions associated with the firmware source code file, a logo associated with the firmware source code file, or an audio file associated with the firmware source code file;
    converting the data file to a data object file comprising the data, wherein converting the data file comprises creating a header, creating a section comprising the data, and creating a section catalog comprising an entry identifying the section;
    converting the firmware source code files to firmware object code files, wherein converting the firmware source code files comprises translating the firmware source code to firmware machine code, creating a further header, creating a further section comprising the firmware machine code, and creating a further section catalog comprising an entry identifying the further section;
    assembling the data object file and the firmware object code files to create a single firmware executable file, wherein the data is distinguishable from the firmware machine code; and
    storing the firmware executable file in a storage section of a firmware storage device;
    associating the firmware executable file with a flap identifying a type of storage associated with the section of the firmware storage device, wherein the flag designates an executable file section or a firmware file system file section; and
    extracting code from the firmware executable file based upon the flag.

2. The method of claim 1, wherein assembling the data object file and the firmware object files comprises:
    creating a firmware executable file header;
    creating a firmware executable file section comprising a first section comprising the data of the data file and a second section comprising the firmware machine code;
    creating a firmware executable file section catalog comprising a first entry identifying the first section and a second entry identifying the second section.

3. The method of claim 1, wherein the firmware storage device is a firmware volume.

4. The method of claim 3, further comprising: associating the firmware executable file with a flag identifying a type of storage associated with the section of the firmware storage device, wherein the flag designates an executable file section or a firmware file system file section; and extracting code from the firmware executable file based upon the flag.

5. A non-transitory computer storage medium having computer-executable instructions stored thereon that, when executed by a computer, cause the computer to:
    obtain firmware source code files comprising firmware source code;
    obtain a data file comprising data associated with the firmware source code files, wherein the data is separate from the firmware source code, and wherein the data file comprises one or more of: scripts comprising definitions associated with the firmware source code file, a logo associated with the firmware source code file, or an audio file associated with the firmware source code file;
    convert the data file associated with the firmware source code files to a data object file, wherein the data file is separate from the firmware source code file and wherein converting the data file comprises creating a header, creating a section comprising the data, and creating a section catalog comprising an entry identifying the section;
    convert the firmware source code files to a firmware source code object file by translating firmware source code of the firmware source code file to firmware machine code creating a further header, creating a further section comprising the firmware machine code, and creating a further section catalog comprising an entry identifying the further section;
    assemble the data object file and the firmware source code object file to create a single firmware executable file, wherein the data is distinguishable from the firmware machine code;
    store the firmware executable file in a storage section of a firmware storage device;
    associate the firmware executable file with a flag identifying a type of storage associated with the section of the firmware storage device, wherein the flag designates an executable file section or a firmware file system file section; and
    extract code from the firmware executable file based upon the flag.

6. The computer storage medium of claim 5, wherein creating the firmware executable file by assembling the data object file and the firmware source code object file comprises:
    creating a firmware executable file header;
    creating a first section including the data and a second section including the firmware machine code; and
    creating a firmware executable file section catalog comprising a first entry identifying the first section and a second entry identifying the second section.

7. The computer storage medium of claim 5, wherein the firmware storage device is a firmware volume.

8. The computer storage medium of claim 5, wherein the firmware executable file comprises a header, a first section comprising data of the data file, a second section comprising the firmware machine code, and a section catalog comprising a first entry identifying the first section and a second entry identifying the second section.

9. The method of claim 4, wherein extracting the code from the firmware executable file comprises:
- extracting the code from the executable file section of the firmware storage device, in response to determining that the firmware executable file is stored as an executable file; and
- extracting the code from the firmware file system file section of the firmware storage device, in response to determining that the firmware executable file is not stored as the executable file.

10. A method for storing a data file associated with a firmware source code file, the method comprising:
- obtaining firmware source code files comprising firmware source code;
- obtaining a data file comprising data associated with the firmware source code files, wherein the data is separate from the firmware source code, and wherein the data file comprises one or more of: scripts comprising definitions associated with the firmware source code file, a logo associated with the firmware source code file, or an audio file associated with the firmware source code file;
- converting the data file to a data object file comprising the data;
- converting the firmware source code files to firmware object code files, wherein converting the firmware source code files comprises translating the firmware source code to firmware machine code;
- generating
  - a header,
  - a first section including the data,
  - a second section including the firmware machine code, and
  - a section catalog comprising a first entry identifying the first section and a second entry identifying the second section;
- assembling the header, the first section, the second section, and the section catalog to create a single firmware executable file; and
- storing the firmware executable file in a storage section of a firmware storage device, wherein the data of the firmware executable file is distinguishable from the firmware machine code of the firmware executable file;
- associating the firmware executable file with a flag identifying a type of storage associated with the section of the firmware storage device, wherein the flag designates an executable file section or a firmware file system file section; and
- extracting code from the firmware executable file based upon the flag.

11. The method of claim 10, further comprising storing the executable file in a firmware file system file of a firmware storage device.

* * * * *